United States Patent Office 2,727,757
Patented Dec. 20, 1955

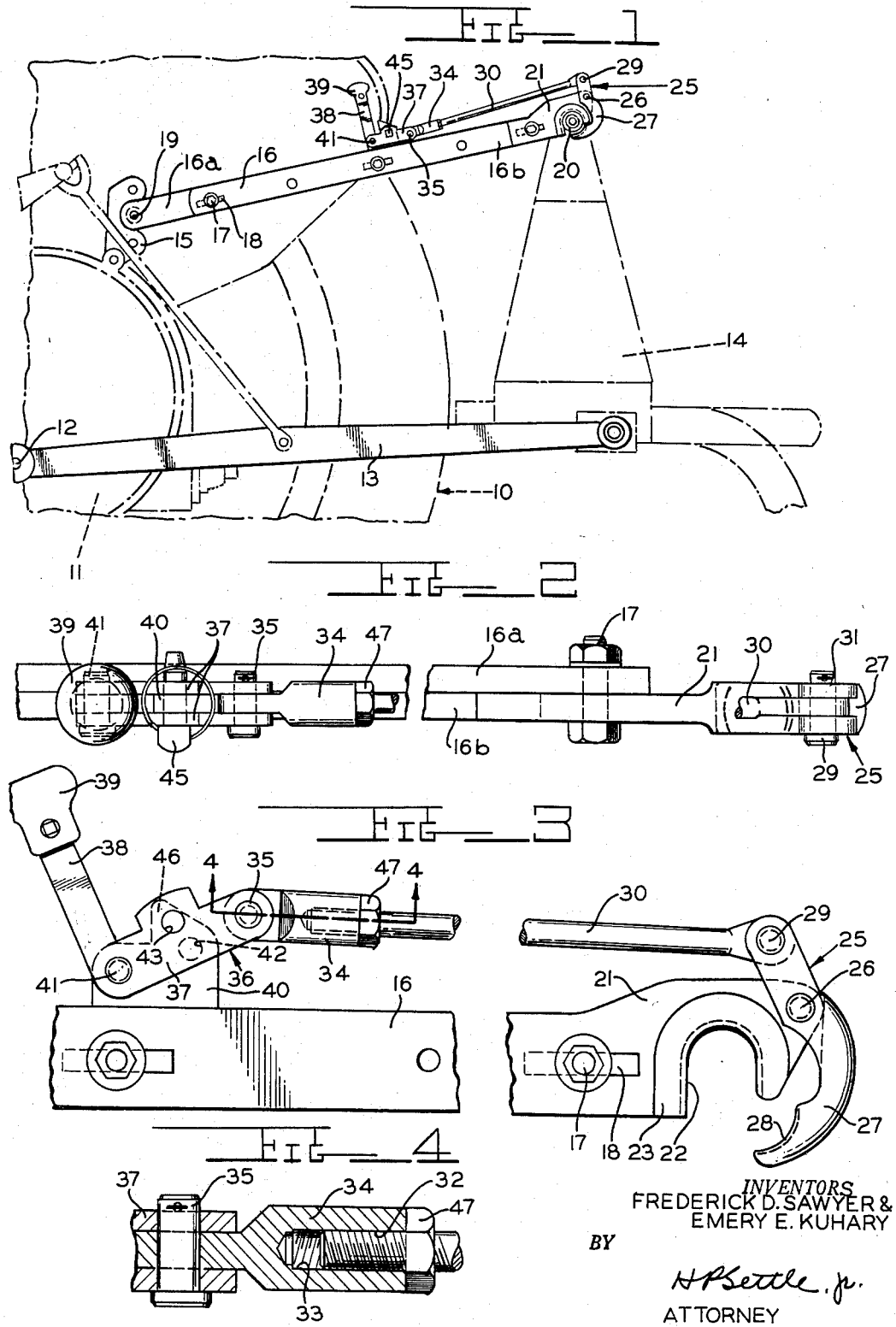

2,727,757

HITCH DEVICE FOR A DRAFT LINK

Frederick D. Sawyer, Birmingham, and Emery E. Kuhary, Royal Oak, Mich., assignors, by mesne assignments, to Ford Motor Company, Dearborn, Mich., a corporation of Delaware Application March 30, 1953, Serial No. 345,392

1 Claim. (Cl. 280—504)

The present invention relates to a link element for a tractor-implement linkage, and more particularly to a trailing tractor link operable from the tractor seat for attaching an implement to the tractor.

The instant invention is particularly adapted to serve as one of the link elements in a three-point linkage for mounted implements, i. e. implements mounted upon and carried by a power-liftable, tractor-mounted linkage including a pair of laterally spaced lower lifting links and a single upper compression link. Preferably, the link herein described is utilized as the upper link of such a linkage, although the link may be adapted to serve as a primary draft element.

Generally, the present invention contemplates the provision of a link element having an attachment bearing in the form of a notch having one open side selectively closable by a latch pivotally movable to a first position at which the notch open side is at least partially closed and to a second position at which the notch is open. A portion of an implement is positionable in the notch and is retained therein by the latch when the same is in its first position.

The latch is actuated by means of an actuating rod pivoted to the latch and joining the same to a bell-crank lever or toggle mechanism pivoted to the link element within easy reach of an operator on the tractor seat. The lever-link element pivot point and the latch-rod pivot point determine a straight line and the lever-rod pivot point moves through and beyond this straight line during closing of the latch.

Thus, the three pivot points have an over-center action, and this action tends to resist opening of the latch from its closed position. To even more positively retain the latch closed, a securing pin is insertable through registering apertures in the bell-crank lever and the link, which apertures are in registry only when the latch is in its closed position.

The safety features of the present invention will be readily appreciated. To close the latch, force must be exerted on the bell-crank lever to force the pivot points over center. Thus, the operator is conscious of the closing of the latch. Further, the securing pin prevents any accidental release of the latch because of jolting or jostling of the link during field operations. The actuating rod length may be varied to accommodate a desired or predetermined degree of over-center movement of the three pivot points.

It is, therefore, an important object of the present invention to provide an improved tractor link actuatable from the tractor seat for securing a mounted implement to the tractor.

Another object is the provision of a tractor link having a pivotal retaining member locked in a retaining position by an over-center toggle mechanism.

It is a further important object to provide a tractor top link wherein an attachment bearing having one open side is adapted to be closed by a pivotal retaining element actuatable through an over-center mechanism.

Still another object of the present invention is the provision of a tractor top link having an over-center locking mechanism and additional retaining means for securing the over-center mechanism in a locked position.

The specific nature of this invention, as well as other objects and advantages thereof, will become apparent to those skilled in the art from the following detailed description, taken in conjunction with the attached sheet of drawings on which, by way of preferred example only, is illustrated one embodiment of this invention.

On the drawings:

Figure 1 is a side elevation of a tractor-implement link of the present invention utilized to interconnect the tractor and the implement, both of which are shown in dotted lines;

Figure 2 is an enlarged and broken plan view of Figure 1;

Figure 3 is an enlarged side elevational view similar to Figure 2; and

Figure 4 is an enlarged sectional view taken along the plane 4—4 of Figure 3.

As shown on the drawings:

In Figure 1, reference numeral 10 refers generally to a tractor having a rear axle housing 11 and a trailing draft link 13, pivotally connected at its forward end to said housing as at 12. It will be appreciated that a pair of laterally-spaced draft links 13 are usually provided to connect the tractor with a rearwardly disposed implement 14.

The tractor rear axle housing 11 carries an upstanding control arm 15 to which is pivotally connected the forward end of a trailing top link 16. The top link 16 comprises a pair of adjacent link elements 16a and 16b (Figure 2) which are joined together by suitable means, as by bolts 17 projecting through slots 18 formed in the elements. The over-all length of the link 16 may be changed by loosening the bolts 17 and allowing the same to slide within the slots 18 formed in the separate link elements 16a and 16b. The forward element 16a is connected by a pivot pin 19 to the tractor control arm 15, while the rear element 16b is adapted to be connected to an upper portion of the implement 14 by a latching mechanism to be hereafter described. The attachment point on the implement is preferably defined by a spherical attachment bearing 20 carried adjacent the upper portion of the A-frame of the implement 14.

The latching mechanism comprises a rear casting or formed portion 21, either formed integrally with the rear section 16b or rigidly secured thereto. The rear section 21 is provided with an open bottomed notch 22 (Figure 3) defined by a bearing insert 23 carried by the casting 21 and having an inner socket portion snugly engageable with the bearing 20. The open bottom of the notch 22 is selectively opened and closed by a latch indicated generally at 25 and preferably taking the form of a lever medially pivoted about a pivot pin 26 carried by the casting 21 generally rearwardly of the notch 22. The latch is provided with a lower arcuate portion 27 terminating in a generally upwardly directed concave seat portion 28 which is adapted to at least partially close the open bottom of the notch when the lever is in its closed position, as illustrated in Figure 1.

The free top end of the latch 25 is pivotally connected, as by attachment pin 29, to a forwardly extending actuating rod 30. The attachment pin 29 is quickly removable from its position securing the actuating rod 30 to the latch 25 and is provided with a cotter key 31 or other easily releasable securing means.

The forward end of the actuating rod 30 is provided with exterior threads 32 (Figure 4), and is threadably received within a threaded axial recess 33 formed in a rod retaining element 34 pivotally secured by a pivot pin 35, similar to the pin 29, to a bell-crank lever or toggle 36. The toggle 36 is provided with a pair of angularly disposed arms, including a generally rearwardly directed arm 37 receiving the pin 35 and a generally upwardly directed actuating arm 38 terminating in a knob 39. The toggle 36 is positioned medially of the link 16 so as to be easily grasped by an operator upon the seat (not shown) of the tractor 10.

The toggle 36 is pivotally connected to the link adjacent the juncture of the arms 37 and 38. More specifically, the toggle is secured to an upstanding bracket 40 welded or otherwise rigidly secured to the rear link element 16b and projects upwardly therefrom to provide means for supporting a pivot pin 41 about which the toggle is arcuately movable. The bracket 40 is provided with an aperture 42 spaced above the link element 16b and the toggle arm 37 is provided with a similar aperture 43 registrable with the aperture 42 when the latch lever 25 is in its closed position, as illustrated in Figure 1. The registering apertures 42 and 43 receive therethrough a link pin or similar securing element 45. It will be noted that the bracket 40 is also provided with an upstanding projection 46 which is registrable with the aperture 43 when the toggle 36 is in its actuated position, as illustrated in Figure 3.

The operation of the link of the present invention will be readily appreciated from the foregoing structural description and from a study of the drawings. When the link is in its position of Figure 1, the latch portion 28 underlies the notch 22 to close the open bottom thereof to such an extent that the attachment bearing 20 is retained within the notch. The latch is retained in the closed position by the linch pin 45 inserted through the registering apertures 42 and 43, so that it is impossible for the toggle member to be moved relative to the link. Further, it will be noted that, in the closed position, the pin 35 joining the actuating rod 30 and the toggle 36 lies below a straight line joining the pivot pin 29, which connects the actuating rod to the latch 25, and the pin 41, which joins the toggle to the link. Thus, an overcenter action is obtained, and this overcenter action aids in preventing displacement of the latch from its closed position, since latch movement must exert compressive force upon the actuating rod 30 and this compressive force tends to move the pivot pin 35 toward a still further overcenter position.

Upon pulling the toggle 36 forwardly, i. e. toward the tractor seat, initial toggle movement overcenters the pin 35 past the straight line joining the pins 29 and 41 and further toggle movement raises the pin 35 towards its open position illustrated in Figure 3.

When the toggle is in its raised position, it will be seen that the apertures 42 and 43 are out of registry, so that it is necessary to first remove the linch pin 45 before the latch can be opened. Further, it will be noted from Figure 3 that the rear toggle arm 37 overlies the aperture 42 and the aperture 43 is covered by the projection 46 on the bracket, so it is impossible to reinsert the linch pin 45 while the latch is open. Accordingly, it is impossible to lock the latch in its opened position.

To again close the latch, it is only necessary to move the handle 39 rearwardly until the pin 35 overcenters, following which the linch pin 45 may be inserted to lock the latch in closed position.

It is desirable to adjust the degree of overcenter movement of the pin 35 to compensate for wear in the moving parts and to insure adequate overcentering to retain the latch in closed position. This adjustment can be easily accomplished by removing the pin 29 to disconnect the actuating rod 30 from the latch 25 or, alternatively, by removing the pin 35 to disconnect the element 34 from the toggle 36, so that the actuating rod may be rotated to adjust the threaded end 32 thereof in the recess 33. A jam nut 47 is provided to retain threaded adjustment of the actuating rod.

It will thus be seen that the present invention provides a new and novel link for a tractor mounted implement. Although the structure is particularly adapted for use as a tractor top link, it will be appraciated that similar links may be used to replace the primary draft links 13, if desired.

Also, any pivotal movement of the implement relative to the tractor must occur about the connection of the lower links 13 to the implement. The notch or socket 22 has a depth greater than the radius of the ball 20, so that the ball always reacts against the socket which is integral with the link 16. The latch 25 is not subjected to the load of the implement whether the implement is in a working position or a raised position. Thus, the latch serves only as a retainer.

It will, of course, be understood that various details of construction may be varied through a wide range without departing from the principles of this invention and it is, therefore, not the purpose to limit the patent granted hereon otherwise than necessitated by the scope of the appended claim.

We claim:

In a tractor-implement linkage of the three point suspension type, a top link comprising an elongated link element having a front end pivotable to the tractor and a rear end extending freely rearwardly therefrom, an attachment bearing at the free rear end of said link element including an open-bottomed notch, a medially pivoted locking lever having a lower portion normally underlying said notch to at least partially close the open end thereof, an actuating rod pivotally connected to said locking member and extending longitudinally of said link element, a bell crank pivotally supported intermediate the ends of said link element, a tubular sleeve pivotally connected at its one end to said bell crank, said sleeve having its other end interiorly threaded, said forward end of said rod having exterior threads to matingly engage said sleeve threaded section for connection thereto, the said other end of said bell crank serving as a handle for reciprocating said rod to actuate said locking member, the pivot point at which said bell crank is connected to said actuating rod being movable beyond the center line connecting the actuating locking member and the bell crank link element pivot centers to lock said locking member in one of its adjusted positions, and whereby said threaded connection is effective to change the effective length of said actuating rod to vary the overcenter movement of said pivot point.

References Cited in the file of this patent
UNITED STATES PATENTS

| | | |
|---|---|---|
| 784,927 | Crisler | Mar. 14, 1905 |
| 2,435,024 | Wagner | July 27, 1948 |
| 2,510,179 | Johnson | June 6, 1950 |
| 2,527,613 | Zagurski | Oct. 31, 1950 |

FOREIGN PATENTS

| | | |
|---|---|---|
| 329,869 | Great Britain | May 29, 1930 |